US010614499B2

(12) United States Patent
Nishioka

(10) Patent No.: US 10,614,499 B2
(45) Date of Patent: Apr. 7, 2020

(54) PRODUCT SEARCH SUPPORT SERVER, PRODUCT SEARCH SUPPORT METHOD, AND PRODUCT SEARCH SUPPORT PROGRAM

(71) Applicant: RAKUTEN, INC., Tokyo (JP)

(72) Inventor: Yuhei Nishioka, Tokyo (JP)

(73) Assignee: Rakuten, Inc., Tokyo (JP)

( * ) Notice: Subject to any disclaimer, the term of this patent is extended or adjusted under 35 U.S.C. 154(b) by 836 days.

(21) Appl. No.: 14/408,601

(22) PCT Filed: May 8, 2013

(86) PCT No.: PCT/JP2013/062935
§ 371 (c)(1),
(2) Date: Dec. 17, 2014

(87) PCT Pub. No.: WO2014/064957
PCT Pub. Date: May 1, 2014

(65) Prior Publication Data
US 2015/0154683 A1 Jun. 4, 2015

(30) Foreign Application Priority Data
Oct. 26, 2012 (JP) ................................ 2012-237103

(51) Int. Cl.
*G06Q 30/06* (2012.01)
*G06Q 30/02* (2012.01)

(52) U.S. Cl.
CPC ..... *G06Q 30/0625* (2013.01); *G06Q 30/0601* (2013.01); *G06Q 30/02* (2013.01); *G06Q 30/0641* (2013.01)

(58) Field of Classification Search
CPC ................................................ G06Q 30/0625
(Continued)

(56) References Cited

U.S. PATENT DOCUMENTS 8,204,897 B1 * 6/2012 Djabarov .......... G06F 17/30705
707/767
2004/0254857 A1 12/2004 Onizuka
(Continued)

FOREIGN PATENT DOCUMENTS

JP      2001344478 A    12/2001
JP      200292416 A     3/2002
(Continued)

OTHER PUBLICATIONS

Raymond, "5 Browser Extensions to Auto Fill forms in Chrome and Firefox" (Nov. 2011). (Year: 2011).*
(Continued)

*Primary Examiner* — Michael Misiaszek
*Assistant Examiner* — Jason B Warren
(74) *Attorney, Agent, or Firm* — Sughrue Mion, PLLC

(57) ABSTRACT

A product search support server that is connected to communicate with a terminal of a user and provides product pages of a plurality of shops selling a same product includes a receiving unit to receive a display request of a product page of one shop from the terminal, an extraction unit to extract product specifying information for uniquely specifying a product on sale on the product page of the one shop from a product information storage unit that stores one or more product information containing shop information indicating a shop and information indicating a product on sale in the shop, and a transmitting unit to transmit search-related information related to search for the one or more product information using the product specifying information to the terminal.

9 Claims, 12 Drawing Sheets

(58) Field of Classification Search
USPC .................................................... 705/26.62
See application file for complete search history.

(56) References Cited

U.S. PATENT DOCUMENTS

| | | | |
|---|---|---|---|
| 2006/0129463 A1* | 6/2006 | Zicherman | G06Q 30/02 705/14.73 |
| 2010/0161659 A1 | 6/2010 | Takeyasu | |
| 2012/0233143 A1* | 9/2012 | Everingham | G06F 17/30967 707/706 |
| 2013/0054415 A1* | 2/2013 | Sundaresan | G06Q 30/06 705/26.41 |
| 2014/0040004 A1* | 2/2014 | Hamo | G06Q 30/0201 705/14.35 |

FOREIGN PATENT DOCUMENTS

| | | |
|---|---|---|
| JP | 2005196478 A | 7/2005 |
| JP | 200815611 A | 1/2008 |
| JP | 2010146366 A | 7/2010 |
| WO | 03038705 A | 8/2003 |

OTHER PUBLICATIONS

International Preliminary Report on Patentability dated May 7, 2015 in a counterpart WO Patent Application No. PCT/JP2013/062935.

* cited by examiner

Fig. 4

PRODUCT PAGE INFORMATION

| PRODUCT PAGE ID | URL | SHOP | MODEL NUMBER | PRICE | TITLE |
|---|---|---|---|---|---|
| 001 | http://AAA.co.jp/a/01.html | A | ABC100 | ¥2,790 | Water Purifier Cartridge manufactured by Company XX ABC100 |
| 002 | http://AAA.co.jp/a/02.html | A | ABC101 | ¥3,300 | Water Purifier Cartridge manufactured by Company XX ABC100 |
| 003 | http://AAA.co.jp/b/01.html | B | ABC100 | ¥2,839 | Water Purifier Cartridge manufactured by Company XX ABC100 |
| ... | ... | ... | ... | ... | ... |

Fig. 10

Top > Search Result for "ABC100"
Return to Top Page

| Sort | Normal ▼ | View | ▦ ▦ | Description of Icons | | 1 to 30 (total 30) |
|---|---|---|---|---|---|---|
| | Water Purifier Cartridge manufactured by Company XX  ABC100 | | | | | ¥2,939 (incl. tax) |
| | ⌂Shop: Shop B  ☐Compare ☐ | | | ✎Comments (1) | | Ⓧ |
| | Water Purifier Cartridge manufactured by Company XX  ABC100 | | | | | ¥2,790 (incl. tax) |
| | ⌂Shop: Shop A  ☐Compare ☐ | | | ✎Comments (1) | | Ⓨ |
| | Water Purifier Cartridge manufactured by Company XX  ABC100 | | | | | ¥2,839 (incl. tax) |
| | ⌂Shop: Shop C  ☐Compare ☐ | | | ✎Comments (1) | | Ⓧ |
| | Water Purifier Cartridge manufactured by Company XX  ABC100 | | | | | ¥2,900 (incl. tax) |
| | ⌂Shop: Shop D  ☐Compare ☐ | | | ✎Comments (1) | | Ⓧ |

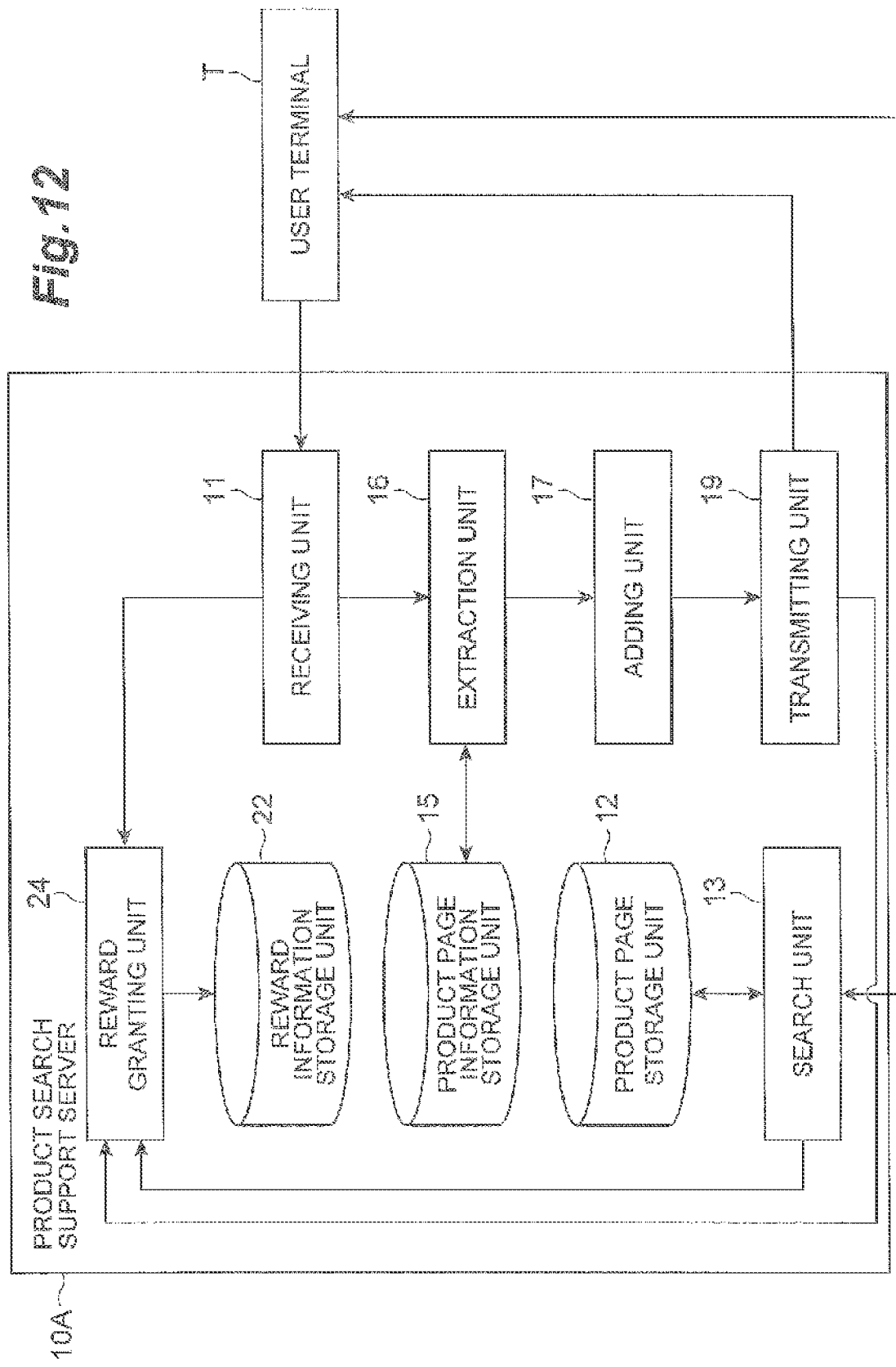

PRODUCT SEARCH SUPPORT SERVER, PRODUCT SEARCH SUPPORT METHOD, AND PRODUCT SEARCH SUPPORT PROGRAM

CROSS REFERENCE TO RELATED APPLICATIONS

This application is a National Stage of International Application No. PCT/JP2013/062935 filed May 8, 2013, claiming priority based on Japanese Patent Application No. 2012-237103, filed Oct. 26, 2012, the contents of all of which are incorporated herein by reference in their entirety.

TECHNICAL FIELD

One embodiment of the present invention relates to a product search support server, method and program that support product search.

BACKGROUND ART

A virtual shopping mall that is established containing a plurality of virtual shops is known. Patent Literature 1 discloses an electronic commerce system that contains a plurality virtual shops and enables a shop to sell a product of another shop as an agent by automatically making commission charge payment for consignment sale.

CITATION LIST

Patent Literature

Patent Literature 1: Japanese Unexamined Patent Application Publication No. 2005-196478

SUMMARY OF INVENTION

Technical Problem

In a typical virtual shopping mall as disclosed in Patent Literature 1, there is a case where a plurality of different shops sell the same product. The sales conditions (for example, a product price, a delivery time, points to be granted and the like) are sometimes different among a plurality of shops for the same product. In this case, a user intends to purchase the product in the shop where the sales conditions for the product are advantageous for the user.

Users access a virtual shopping mall through various channels. For example, some users reach a product page of a specific shop directly through a search engine or a link on a feature page in a virtual shopping mall, instead of reaching a product page by searching for a desired product on a top page of the virtual shopping mall. In such a case, a user cannot determine whether the sales conditions for the product in the shop visited are advantageous compared with the sales conditions for the product in other shops in the virtual shopping mall and therefore sometimes hesitate to purchase the product. Further, in order to find a shop that offers the better sales conditions, it takes time and effort to search for product pages of other shops in the virtual shopping mall.

Accordingly, there is demand for a scheme to support a user to decide a shop to purchase a product.

Solution to Problem

A product search support server according to one aspect of the present invention is a product search support server that is connected to communicate with a terminal of a user and provides product pages of a plurality of shops selling a same product, the server including a receiving unit configured to receive a display request of a product page of one shop from the terminal, an extraction unit configured to extract product specifying information for uniquely specifying a product on sale on the product page of the one shop from a product information storage unit that stores one or more product information containing shop information indicating a shop and information indicating a product on sale in the shop, and a transmitting unit configured to transmit search-related information related to search for the one or more product information using the product specifying information to the terminal.

A product search support method according to one aspect of the present invention is a product search support method that connects to communicate with a terminal of a user and provides product pages of a plurality of shops selling a same product, the method including a receiving step of receiving a display request of a product page of one shop from the terminal, an extraction step of extracting product specifying information for uniquely specifying a product on sale on the product page of the one shop from a product information storage unit that stores one or more product information containing shop information indicating a shop and information indicating a product on sale in the shop, and a transmitting step of transmitting search-related information related to search for the one or more product information using the product specifying information to the terminal.

A product search support program according to one aspect of the present invention is a product search support program causing a computer to function as a product search support server that is connected to communicate with a terminal of a user and provides product pages of a plurality of shops selling a same product, the program causing the computer to implement a receiving function to receive a display request of a product page of one shop from the terminal, an extraction function to extract product specifying information for uniquely specifying a product on sale on the product page of the one shop from a product information storage unit that stores one or more product information containing shop information indicating a shop and information indicating a product on sale in the shop, and a transmitting function to transmit search-related information related to search for the one or more product information using the product specifying information to the terminal.

According to the above aspects, the product specifying information that can uniquely specify a product on sale on the product page related to the display request is extracted, and the search-related information related to search for a plurality of product information using the product specifying information is transmitted to a user. Because the product specifying information can uniquely specify a product, a user can obtain information about a product on sale among a plurality of shops using the search-related information. It is thereby possible to support a user to decide a shop to purchase a product.

The product search support server according to another aspect may further include an adding unit configured to add the search-related information to the product page of the one shop, and a search input field for entering a search keyword may be placed on the product page of the one shop, the adding unit may enter the product specifying information as a search default value in the search input field on the product page of the one shop, and the transmitting unit may transmit the product page of the one shop where the product specifying information is entered in the search input field to the terminal.

According to this aspect, the product page where the product specifying information is entered as a search default value in the search input field is transmitted to the terminal of a user, and therefore the user can search for the same product as the product on sale from product pages of a plurality of shops simply by making a search with the search default value without entering a search word related to the product on sale. It is thereby possible to support a user to decide a shop to purchase a product.

The product search support server according to another aspect may further include an adding unit configured to add the search-related information to the product page of the one shop, and the adding unit may retrieve product information related to the product specifying information from the product information storage unit and adds additional information being information based on shop information related to the retrieved product information to the product page of the one shop, and the transmitting unit may transmit the product page of the one shop where the additional information is added to the terminal.

According to this aspect, a product page of one shop to which additional information is added is transmitted to a terminal. The additional information is information about a product page related to the product specifying information. Therefore, a user can obtain information about a shop selling a product related to the product on sale by referring to the additional information. It is thereby possible to support a user to decide a shop to purchase a product.

In the product search support server according to another aspect, the product information may further contain a selling price of a product, and the adding unit may retrieve product information related to the product specifying information from the product information storage unit, extract product information for a shop with a lowest selling price among the retrieved product information, and add information based on shop information related to the extracted product information as the additional information.

According to this aspect, because information about a shop with the lowest selling price is added as the additional information, a user can easily find a shop that sells a desired product at the lowest price. It is thereby possible to support a user to decide a shop to purchase a product.

In the product search support server according to another aspect, the product information may further contain a delivery time of a product, and the adding unit may retrieve product information related to the product specifying information from the product information storage unit, extract product information for a shop with a shortest delivery time among the retrieved product information, and add information based on shop information related to the extracted product information as the additional information.

According to this aspect, because information about a shop with the shortest delivery time is added as the additional information, a user can easily find a shop that delivers a desired product in the shortest delivery time. It is thereby possible to support a user to decide a shop to purchase a product.

The product search support server according to another aspect may further include a use shop acquisition unit configured to acquire shops the user has used in a past from a use shop storage unit that stores shops the user has used in a past, and the adding unit may retrieve product information related to the product specifying information from the product information storage unit, extract product information for a shop the user has used in a past among the retrieved product information, and add information based on shop information related to the extracted product information as the additional information.

According to this aspect, because information about a shop which a user has used in the past is added as the additional information, a user can purchase a product in a familiar shop. It is thereby possible to give a user the sense of security and encourage the purchase of a product.

The product search support server according to another aspect may further include an adding unit configured to, when a transition request from the product page of the one shop to a search page having a search input field for entering a search keyword by an operation of the terminal by the user is detected after the product page of the one shop is transmitted to the terminal by the transmitting unit, enter the product specifying information as a search default value in the search input field, and the transmitting unit may transmit the search page where the product specifying information is entered in the search input field to the terminal.

When a user intends to search for a desired product among a plurality of shops, the user moves to the search page and then enters a search keyword in the search input field. In this aspect, when a transition request from the product page of one shop to the search page is detected, the product specifying information is entered as a search default value in the search input field, and therefore the user can search for the same product as the product on sale from product pages of a plurality of shops simply by making a search with the search default value without entering a search keyword related to the product on sale. It is thereby possible to facilitate search for a product on sale in another shop.

The product search support server according to another aspect may further include a behavior history acquisition unit configured to acquire a behavior history of the user from a behavior history storage unit that stores a behavior history of the user, and a determination unit configured to determine whether the user tends to make a search using the search input field after moving to the search page based on the behavior history, and when it is determined by the determination unit that the user does not tend to make a search using the search input field after moving to the search page, the adding unit may not enter the product specifying information as a search default value in the search input field.

Some user moves to the search page for a purpose other than search. If a search default value is entered in the search input field in such a case, the user may feel it bothersome. According to this aspect, because whether or not to enter the product specifying information as a search default value in the search input field is changed based on the behavior history of a user, it is possible to prevent bothersome display for a user who moves to the search page for a purpose other than search.

The product search support server according to another aspect may further include a search unit configured to receive a search request from the terminal, extract product pages corresponding to the search request from the product pages of the plurality of shops, and output a list of the extracted product pages to the terminal, and a reward granting unit configured to receive a search request related to the product specifying information from the user, and after detecting that the product on sale is purchased by the user in another shop different from the one shop, update reward data indicating the amount of reward to be paid for each shop indicated by the shop information so that a reward is paid to the one shop. According to this aspect, because a reward is paid to one shop that contributes to sales of another shop, the sense of unfairness between a plurality of shops can be reduced.

Advantageous Effects of Invention

According to one aspect of the present invention, it is possible to support a user to decide a shop to purchase a product.

BRIEF DESCRIPTION OF DRAWINGS

FIG. 4 is a diagram showing one example of product page information.

FIG. 10 is a diagram showing one example of output by a search unit.

FIG. 12 is a block diagram showing a functional configuration of a product search support server according to a second embodiment.

DESCRIPTION OF EMBODIMENTS

Embodiments of the present invention will be described hereinafter in detail with reference to the appended drawings. Note that, in the description of the drawings, the same or equivalent elements are denoted by the same reference symbols, and the redundant explanation thereof is omitted.

First Embodiment

Figure 1:
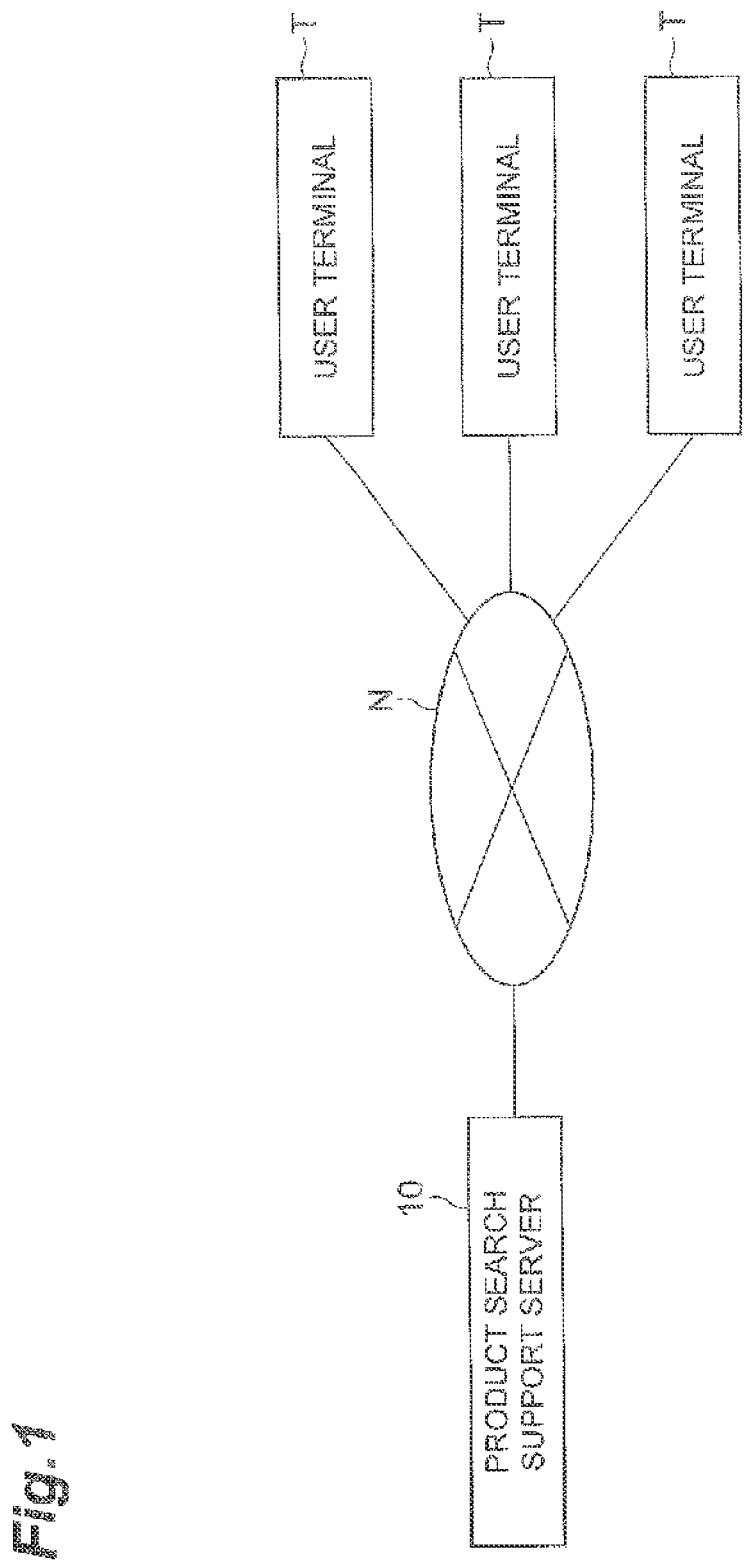
FIG. 1 is a diagram showing an overall configuration of a system including a product search support server according to a first embodiment.

The functions and configuration of a product search support server 10 according to this embodiment are described hereinafter with reference to FIGS. 1 to 3. The product search support server 10 is a computer system that performs search support for a user in order to facilitate search for products that are sold in a virtual shopping mall which contains a plurality of virtual shops. As shown in FIG. 1, the product search support server 10 is connected to a plurality of user terminals T through a communication network N.

The user terminals T are terminals of persons (users) who view or purchase products in the virtual shopping mall. Although there are a plurality of user terminals T in FIG. 1, the number of user terminals T is not particularly limited.

The user terminals T are computing terminals of any type such as personal computers, personal digital assistants (PDA) and mobile phones, for example.

Figure 2:
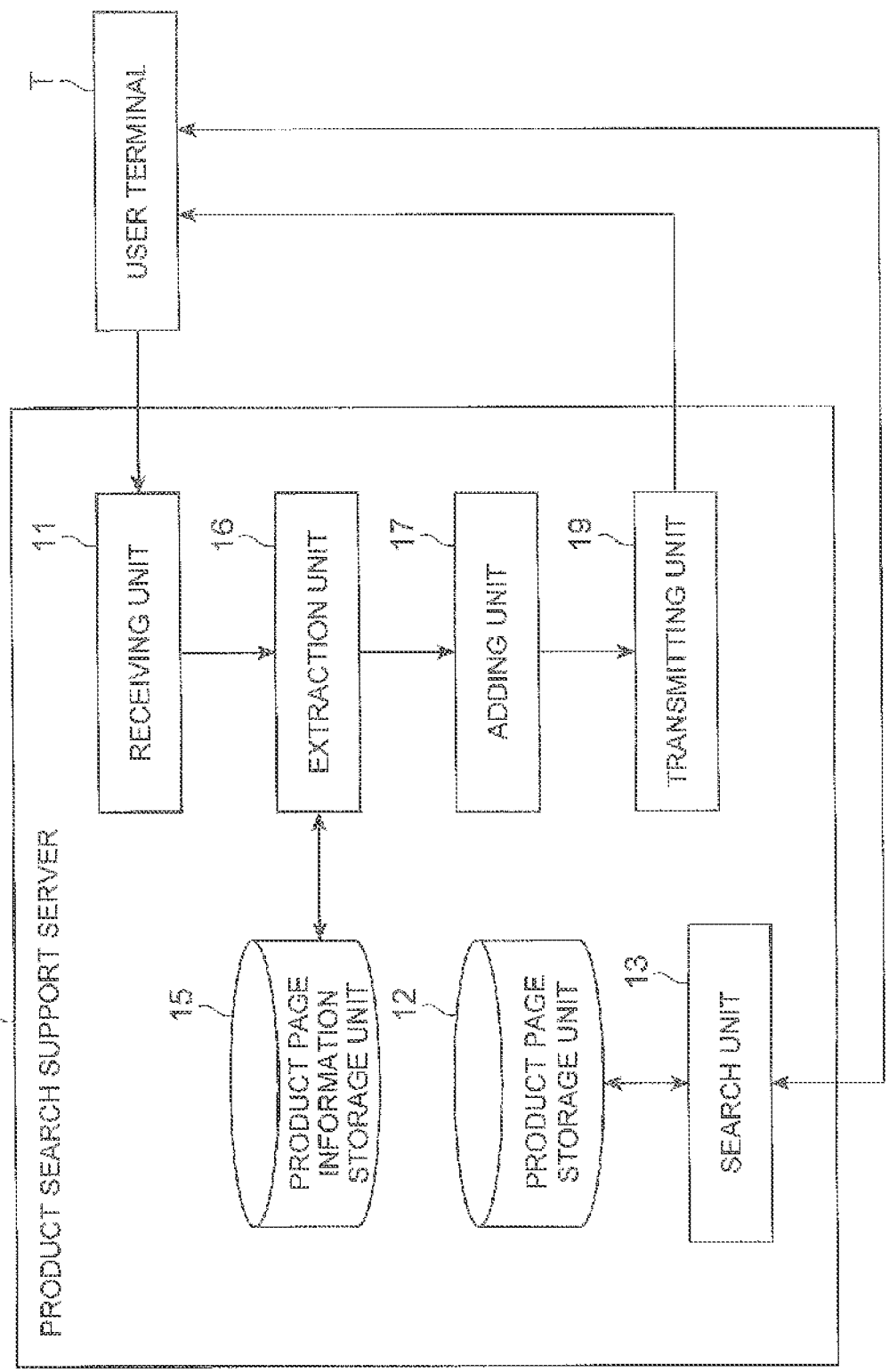
FIG. 2 is a block diagram showing a functional configuration of the product search support server according to the first embodiment.

As shown in FIG. 2, the product search support server 10 includes a receiving unit 11, a product page storage unit (product information storage unit) 12, a search unit 13, a product page information storage unit (product information storage unit) 15, an extraction unit 16, an adding unit 17, and a transmitting unit 19 as functional components.

Figure 3:
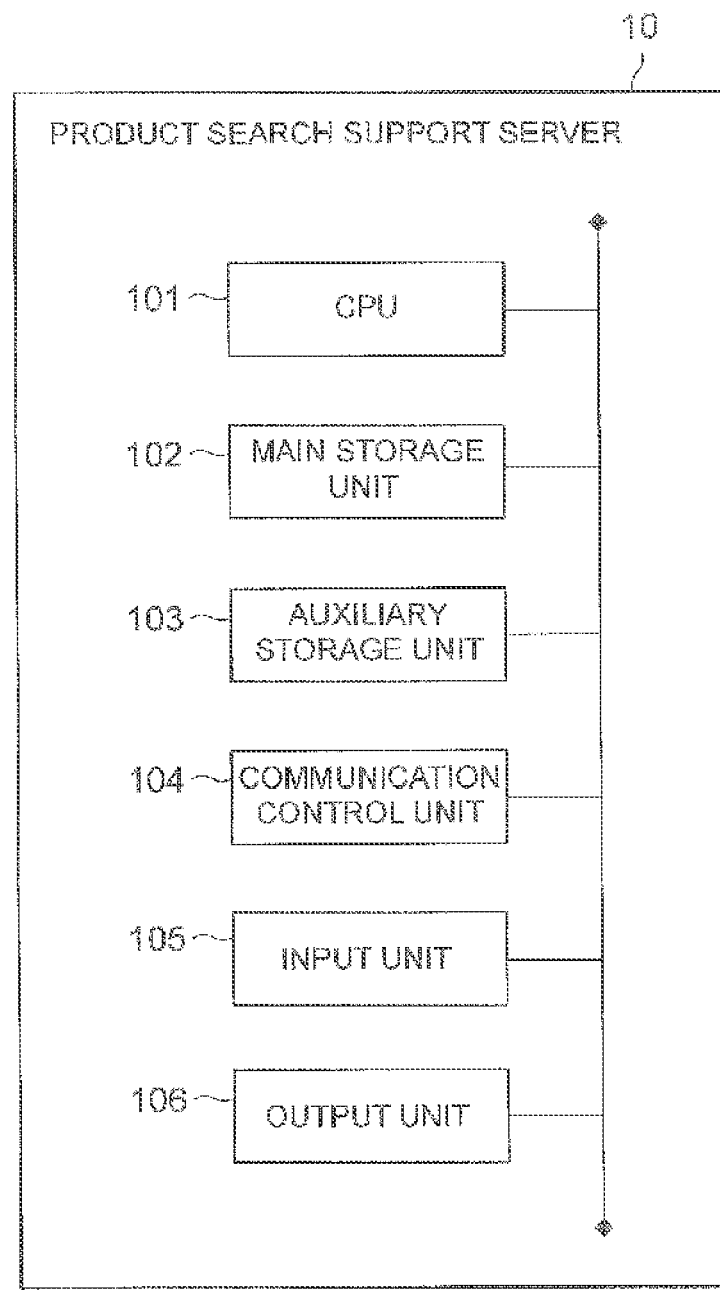
FIG. 3 is a diagram showing a hardware configuration of the product search support server according to the first embodiment.

As shown in FIG. 3, the product search support server 10 includes a CPU 101 that executes an operating system, an application program and the like, a main storage unit 102 such as ROM and RAM, an auxiliary storage unit 103 such as a hard disk, a communication control unit 104 such as a network card, an input unit 105 such as a keyboard and a mouse, and an output unit 106 such as a monitor. The functions shown in FIG. 2 are implemented by loading given software onto the CPU 101 or the main storage unit 102, making the communication control unit 104, the input unit 105, the output unit 106 and the like operate under control of the CPU 101, and performing reading and writing of data in the main storage unit 102 or the auxiliary storage unit 103. The data and database required for processing are stored in the main storage unit 102 or the auxiliary storage unit 103.

Note that, although the product search support server 10 is composed of one computer in FIG. 3, the functions of the product search support server 10 may be distributed among a plurality of computers. For example, the product search support server 10 may be composed of a computer having a database function and a computer having the other functions.

Referring back to FIG. 2, the receiving unit 11 is a means of receiving a display request of a product page of one shop among a plurality of shops contained in the virtual shopping mall from the user terminal T. The display request can contain a product page ID which is an identifier for identifying a product page (which is also referred to hereinafter as "visited page") which a user requests to display. The receiving unit 11 outputs the display request received from the user terminal T to the extraction unit 16.

Figure 5:
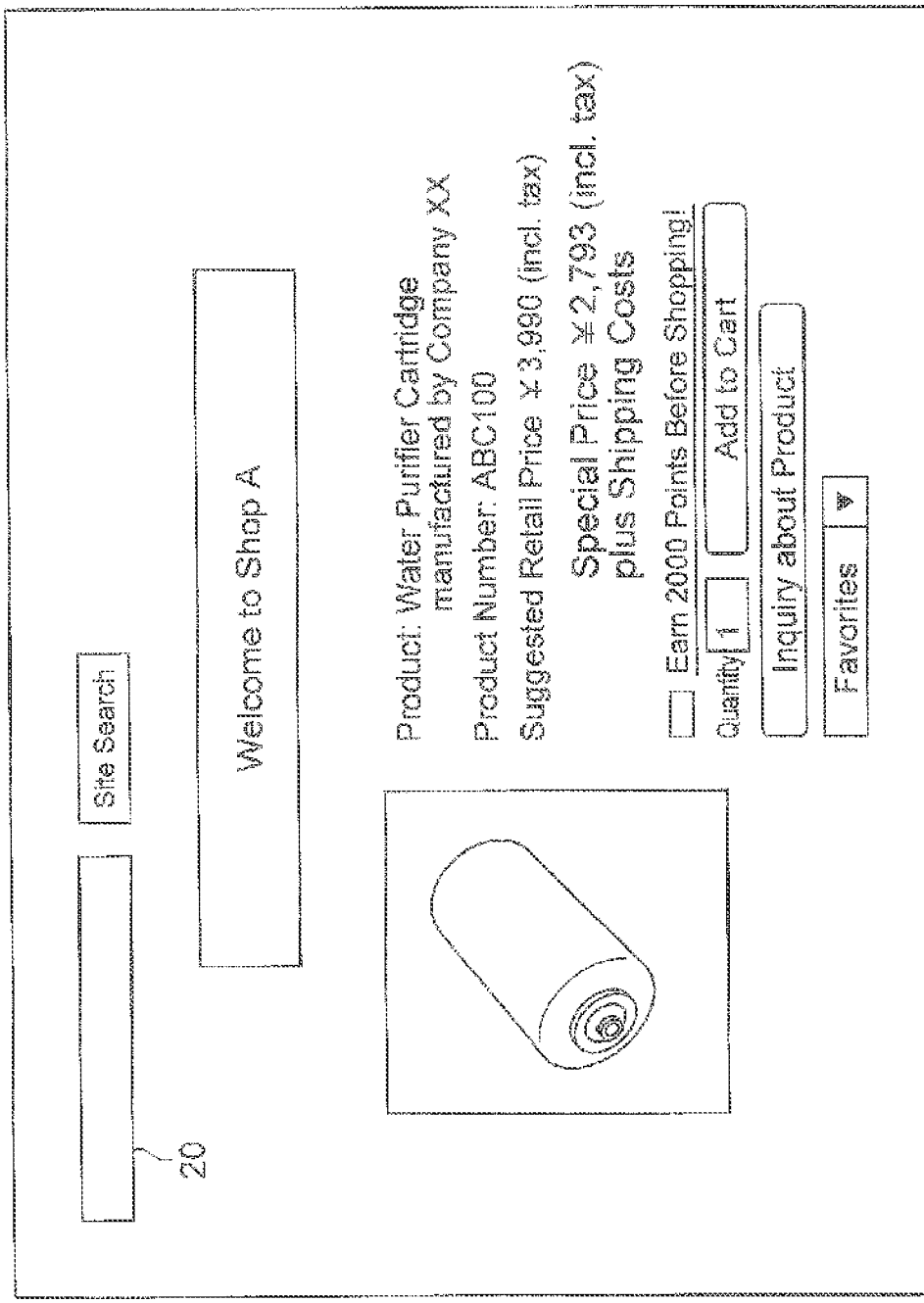
FIG. 5 is a diagram showing one example of a product page.

The product page storage unit 12 is a means of storing a product page ID and product page data in association with each other. The product page data is data for displaying a product page, such as an HTIvIL file, for example. The product page is a webpage where a user can view and purchase a product by an operation of the user terminal T. Although the structure of the product page is arbitrary, it includes, in one example, a shop name that provides the product page, a product image, a product description, a product purchase button and the like. Note that the product page storage unit 12 is not an essential element. FIG. 5 shows one example of the product page.

The search unit 13 is a means of receiving a search request from the user terminal T, extracting product pages corresponding to the search request from the product page storage unit 12, and outputting a list of the extracted product pages to the user terminal. The search request is transmitted from the user terminal T to the search unit 13 by entering a search word (search keyword) in a search input field on the product page or on the top page of the virtual shopping mall and making a search.

The product page information storage unit 15 is a means of storing product page information (product information) related to product pages of a plurality of shops. FIG. 4 shows one example of the product page information. As shown in FIG. 4, the product page information contains items "product page ID", "URL", "shop", "model number", "price" and "title". The "product page ID" indicates an identifier that identifies a product page, the "URL" indicates URL of a product page, and the "shop" indicates a shop selling a product (which is also referred to hereinafter as a "product on sale") on a product page. The "model number" indicates the model number of a product on sale, the "price" indicates the selling price of a product on sale in a selling shop, and the "title" indicates the page title of a product page. Note that the product page information may include an item other than the items "product page ID", "URL", "shop", "model number", "price" and "title", such as "product ID", for example, and may not include some of those items. Note that the product page information storage unit 15 is not an essential element.

The extraction unit 16 is a means of extracting product specifying information of a product on sale on the product page related to the display request received from the user terminal T. The product specifying information is a character string that can uniquely specify a product, such as the model number of a product, a unique code, a product name or a product ID, for example. Referring to the example of the product page information shown in FIG. 4, when the product page ID contained in the display request is "001", the extraction unit 16 extracts the model number "ABC100" of the record corresponding to the product page ID "001" as the product specifying information. The extraction unit 16 outputs the display request received from the user terminal T and the product specifying information to the adding unit 17.

Note that various technique may be used for the extraction of the product specifying information by the extraction unit 16. For example, in the case where the item of a unique code or a product name is contained in the product page information, the value of the unique code or the product name may be extracted instead of the model number. The unique code is a character string that is different for each product, which is assigned by an administrator of the virtual shopping mall in order to identify the product available in the virtual shopping mall. Further, the extraction unit 16 may analyze the character string included in the "title" in the product page information storage unit 15 and extract the product specifying information such as a model number from the character string.

In the case where the product search support server 10 does not include the product page information storage unit 15, the HTML file of the visited page may be analyzed to extract the product specifying information from the tile of the visited page, the product description contained in the visited page or the like. In the case of extracting the product specifying information from the visited page in this manner, the product specifying information may be extracted by character analysis based on machine learning, using a tag of the HTML file or the like, for example.

The adding unit 17 is a means of adding search-related information related to search of a plurality of product information using the product specifying information output from the extraction unit 16 to a webpage. The search-related information is a concept including information for searching for a product available in a plurality of shops using a product specifying word as a keyword and information obtained by searching for a product available in a plurality of shops using a product specifying word as a keyword. The adding unit 17 adds the search-related information according to any of three aspects described below. Hereinafter, the processing of the adding unit 17 in the case where a display request of the product page shown in FIG. 5 is made by the user terminal T is described. The product page shown in FIG. 5 is a product page that is provided by a shop A. This product page is a webpage that sells a water purifier cartridge with the model number "ABC100". A search input field 20 to enter a search word related to a search request is placed in the upper part of the product page.

(First Aspect)

Figure 6:
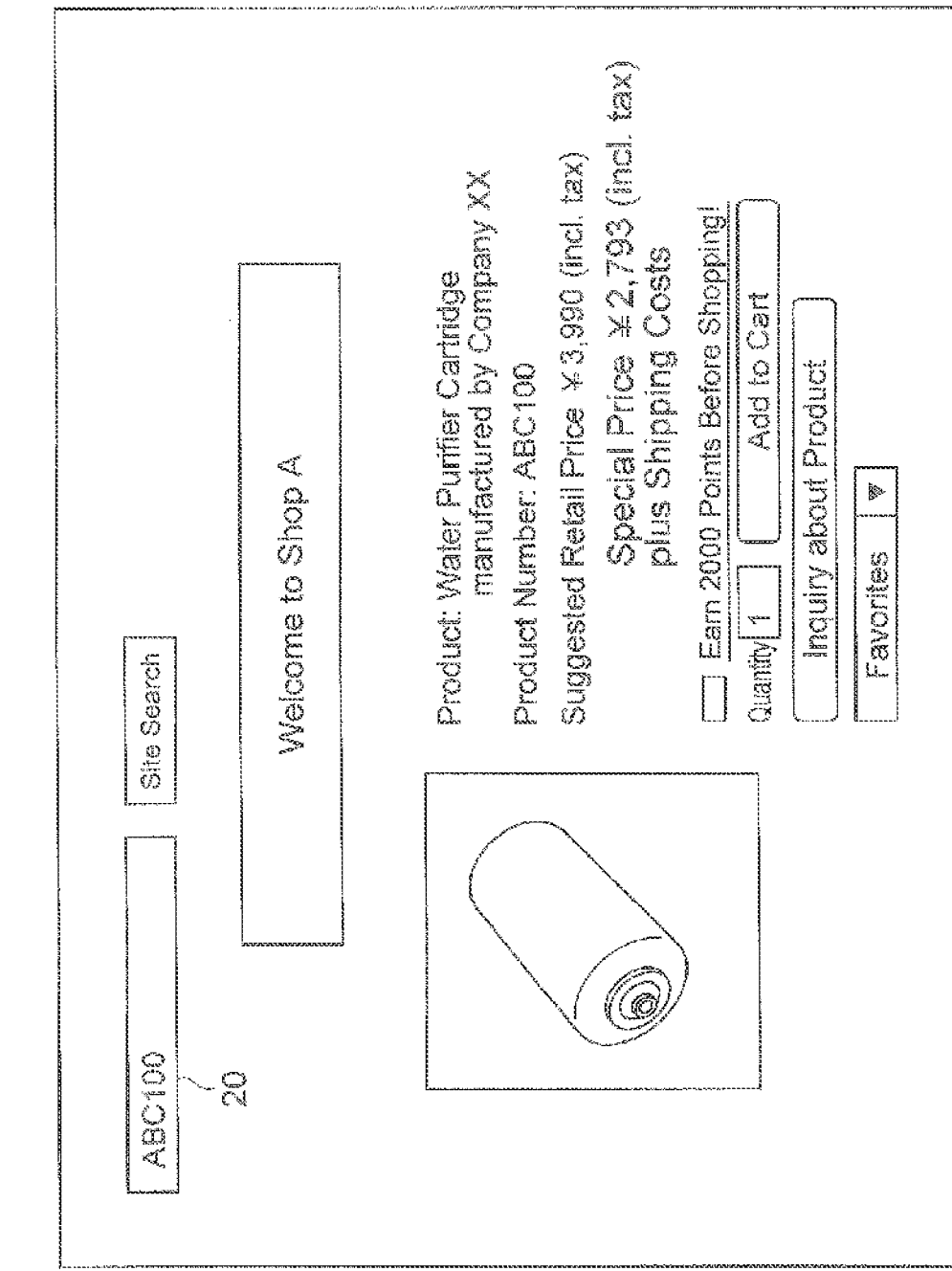
FIG. 6 is a diagram showing one example of a product page where a search default value is entered.

In the first aspect, the adding unit 17 enters the product specifying information as a search default value in the search input field of a visited page. The adding unit 17 receives a product page ID contained in a display request and then acquires a product page corresponding to the received product page ID, which is a visited page, from the product page storage unit 12. Then, as shown in FIG. 6, the product specifying information output from the extraction unit 16 is entered as a search default value in the search input field of the product page. In the above example, the model number "ABC100" of the water purifier cartridge is entered in the search input field on the product page of the shop A. The adding unit 17 outputs the visited page where the product specifying information is entered as a search default value to the transmitting unit 19. In this aspect, the product specifying information that is entered as a search default value in the search input field serves as the search-related information.

(Second Aspect)

In the second aspect, the adding unit 17 retrieves product pages related to the product specifying information from the product page information storage unit 15 and adds additional information based on the retrieved product page to the visited page. The adding unit 17 receives product specifying information from the extraction unit 16 and then retrieves one or more records corresponding to the product specifying information from the product page information storage unit 15. Then, the adding unit 17 specifies a record where the lowest selling price is set among the extracted one or more records. In the case where there are a plurality of records where the lowest selling price is set, the plurality of records can be specified. After that, the adding unit 17 compares the shop included in the specified record with the shop related to the visited page. When the shop included in the specified record with the shop related to the visited page are the same, which is when the shop of the visited page sells the product at the lowest price, the adding unit 17 adds information indicating that the product page offers the lowest price to the visited page. In this aspect, the information indicating that it is the lowest price serves as the additional information. In this aspect, the additional information serves as the search-related information.

Figure 7:
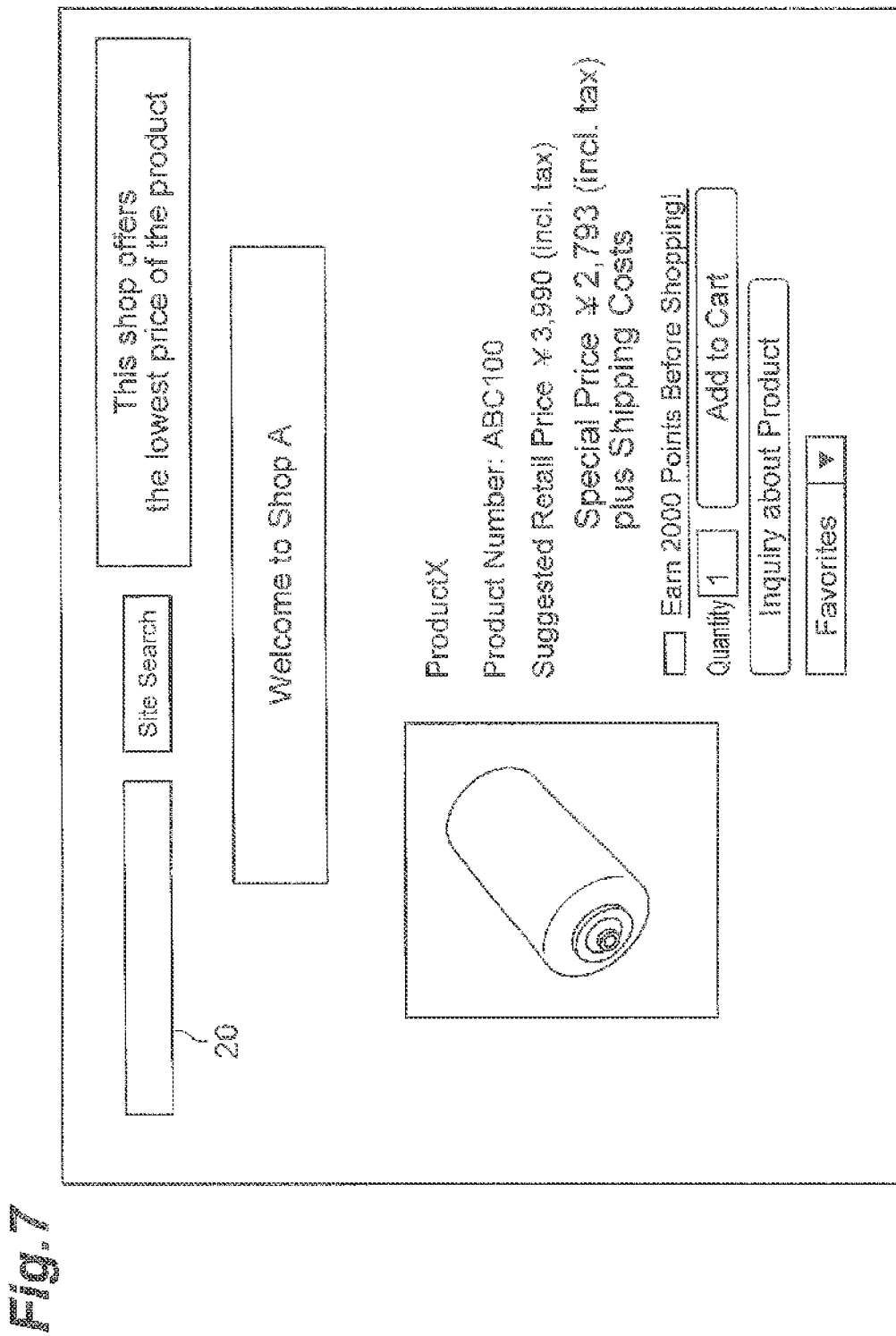
FIG. 7 is a diagram showing another example of a product page where additional information is added.

In the above example, when the shop A sells the water purifier cartridge with the model number "ABC100" at the lowest price among a plurality of shops registered in the virtual shopping mall, the adding unit 17 adds the image "This shop offers the lowest price of the product" in the product page as shown in FIG. 7.

On the other hand, when the shop A does not offer the lowest price, the adding unit 17 may add information indicating the product page of a shop with the lowest selling price as the additional information. The information indicating the product page of a shop with the lowest selling price may be an image containing a link to the product page of the shop with the lowest selling price, for example. As a result that such additional information is added to the visited page, a user can easily find a shop that sells a desired product at the lowest price.

Further, in the case where a product page and the delivery time of a product on sale on the product page are stored in association with each other in the product page information storage unit 15, the adding unit 17 may retrieve the product pages related to the product specifying information from the product page information storage unit 15 and add information indicating the product page of a shop with the shortest delivery time among the retrieved product pages as the additional information. As a result that such additional information is added to the visited page, a user can easily find a shop that delivers a desired product in the shortest delivery time.

Likewise, in the case where a product page and the points earned when purchasing a product on sale on the product page are stored in association with each other in the product page information storage unit 15, the adding unit 17 may retrieve the product pages related to the product specifying information from the product page information storage unit 15 and add information indicating the product page of a shop with the largest number of points to be earned among the retrieved product pages as the additional information. As a result that such additional information is added to the visited page, a user can easily find a shop where the largest number of points can be earned when purchasing a desired product.

Further, the adding unit 17 may retrieve product pages related to the product specifying information from the product page information storage unit 15 and add information indicating the product page of the shop which a user has used in the past among the retrieved product pages as the additional information. In this case, it is necessary to include a use shop storage unit that stores shops which a user has used in the past and a use shop acquisition unit that acquires shops which a user has used in the past. As a result that such additional information is added to the visited page, a user can purchase a product in a familiar shop. It is thereby possible to give a user the sense of security and encourage the purchase of a product.

(Third Aspect)

Figure 8:
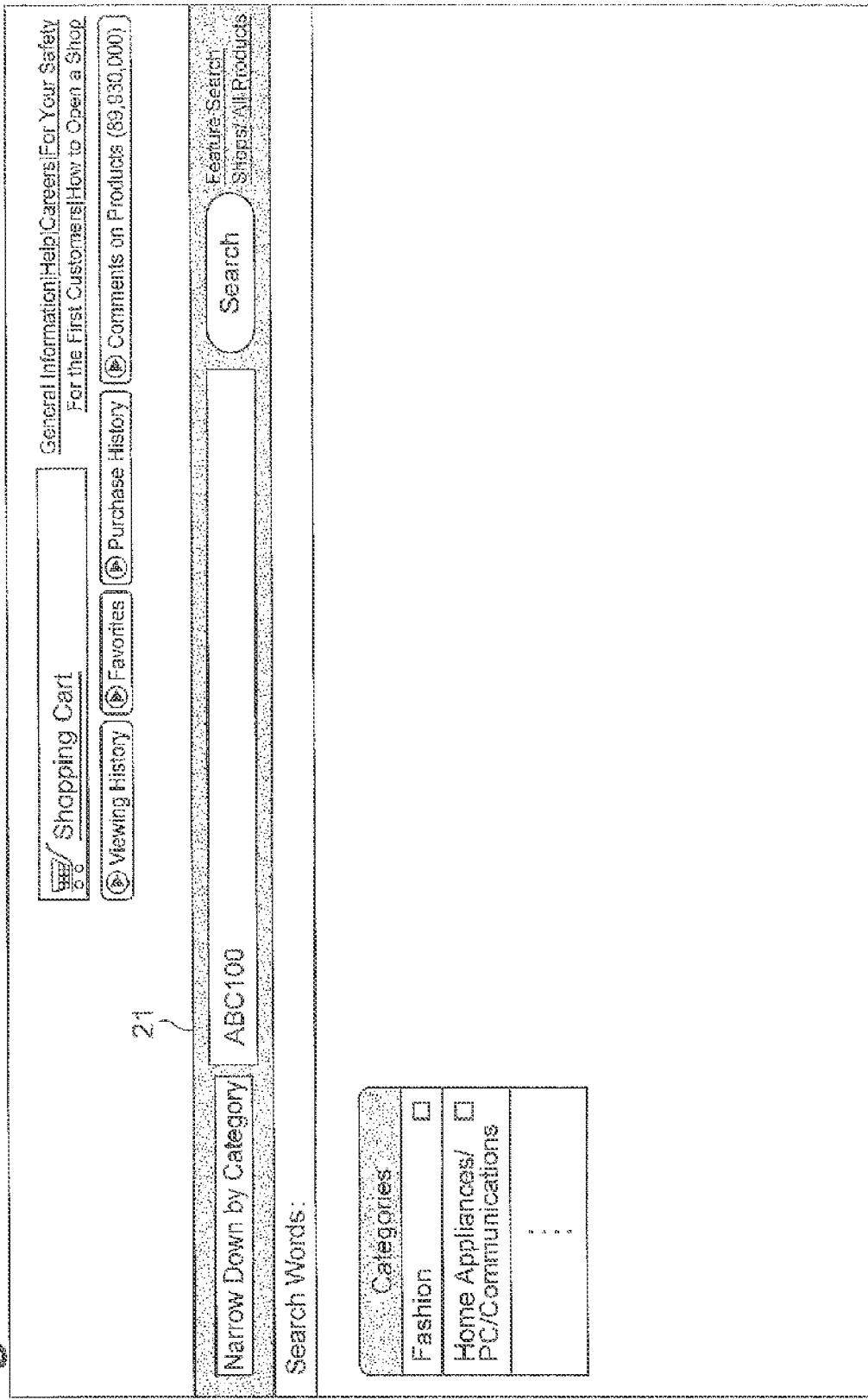
FIG. 8 is a diagram showing one example of a top page of a virtual shopping mall where a search default value is entered.

In the third aspect, the adding unit 17 enters the product specifying information as a search default value in the search input field on the top page of the virtual shopping mall when, after a visited page is transmitted to the terminal by the transmitting unit 19, a transition request from the visited page to the top page (search page) of the virtual shopping mall by an operation of the user terminal T by a user is detected. The adding unit 17 receives a product page ID contained in a display request and then extracts a product page corresponding to the received product page ID, which is a visited page, from the product page storage unit 12. Then, when transition is made from the extracted product page to the top page of the virtual shopping mall by an operation of the user terminal T, the adding unit 17 adds a script to the HTML file of the visited page so that the product specifying information is entered as a search default value in a search input field 21 on the top page of the virtual shopping mall. Thus, in the third aspect, the visited page that is displayed on the user terminal T by the transmitting unit 19, which is described later, is the visited page shown in FIG. 5. After that, when a user clicks on a link in the product page, for example, and the page transitions to the top page of the virtual shopping mall, the webpage where the model number "ABC100" of the water purifier cartridge is entered as a search default value in the search input field 21 on the top page of the virtual shopping mall is displayed as show in FIG. 8. In this aspect, the product specifying information that is entered as a search default value in the search input field 21 serves as the search-related information.

Note that the adding unit 17 may monitor communication between the product search support server 10 and the user terminal T and add the additional information, rather than adding a script to the HTML file of the visited page. For example, when, a transition request from a product page of one shop to a search page having the search input field 21 for entering a search request by an operation of the user terminal T by a user is detected after a visited page is transmitted to the user terminal T by the transmitting unit 19, the product specifying information may be entered as a search default value in the search input field 21.

The adding unit 17 may change whether or not to enter the product specifying information as a search default value in the search input field 21 based on a user behavior history. Some user moves to the top page for a purpose other than to search, such as to view the points earned. If a search default value is entered in the search input field 21 on the top page in such a case, the user may feel it bothersome. Thus, for a user who does not make a search after moving to the top page based on the behavior history of the user, for example, the adding unit 17 does not enter the product specifying information as a search default value in the search input field, thereby preventing bothersome display for the user. In this case, the product search support server 10 needs to include a behavior history storage unit that stores a behavior history of a user, a behavior history acquisition unit that acquires a behavior history of a user, and a determination unit that determines whether a user tends to make a search using the search input field after moving to the top page.

Hereinafter, the product page and the top page of the virtual shopping mall to which a search default value or additional information is added by the adding unit 17 according to the first to third aspects described above are referred to as "search support output page" in this specification for the convenience of description. The adding unit 17 generates the search support output page according to the above aspects and outputs the search support output page to the transmitting unit 19.

The transmitting unit 19 is a means of transmitting the search support output page generated by the adding unit 17 to the user terminal T. The webpage where information based on the product specifying information is added to the visited page or the top page is thereby displayed on the user terminal T.

Figure 9:
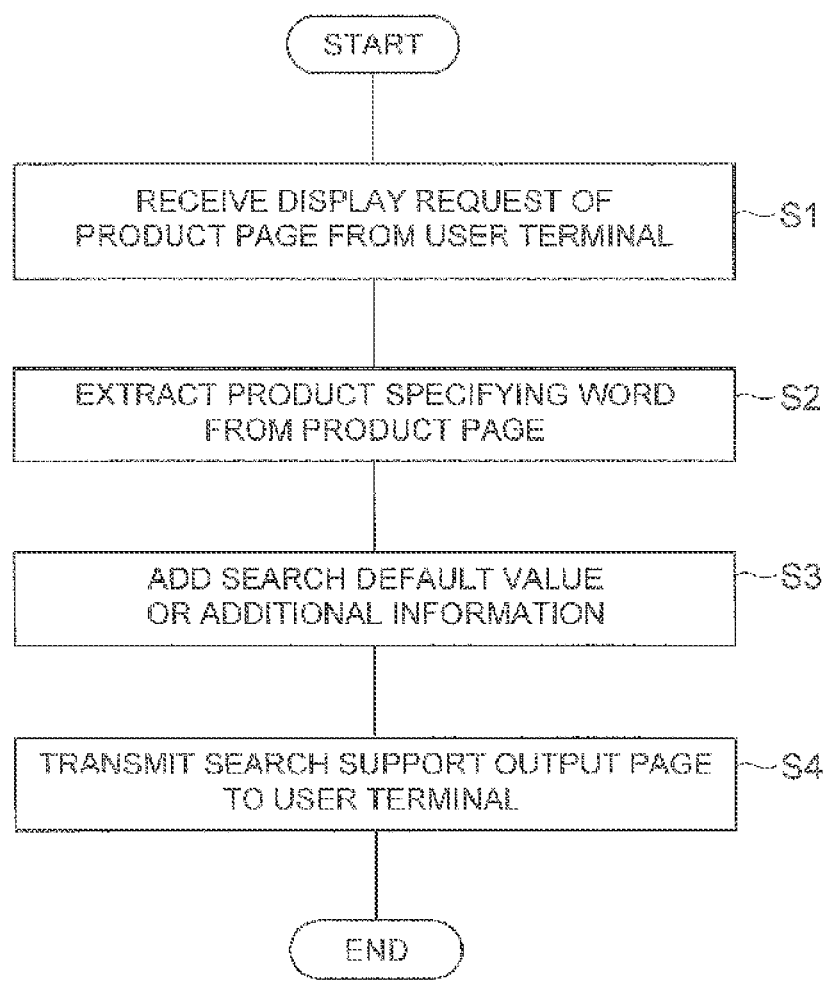
FIG. 9 is a flowchart showing a product search support method performed by the product search support server according to the first embodiment.

The operation of the product search support server 10 is described and further a product search support method according to this embodiment is described hereinafter with reference to FIG. 9.

First, the receiving unit 11 receives a display request of a product page from the user terminal T (Step S1, receiving step). The display request contains a product page ID. Although the receiving unit 11 can receive the display request from the user terminal T that makes an access through any channel, it is assumed in the following description that a display request of a product page is transmitted from a search result by a search engine for easier understanding of the effects. To be specific, it is assumed that the user terminal T makes a search by "water purifier cartridge" in the search engine and transmits a display request of a product page of a desired product from the search result to the product search support server 10. The product page related to the display request is shown in FIG. 5.

Next, the extraction unit 16 extracts product specifying information from the product page related to the display request (Step S2, extraction step). In the above example, the extraction unit 16 extracts "ABC100" as the product specifying information. Then, the adding unit 17 adds a search default value or additional information to the visited page based on the product specifying information (Step S3). Further, the adding unit 17 may add a search default value to the top page of the virtual shopping mall based on the product specifying information. Specifically, the adding unit 17 generates a search support output page by any of the above-described first to third aspects. After that, the transmitting unit 19 transmits the generated search support output page to the user terminal T (Step S4, transmitting step). In this manner, the search support output page is displayed on the user terminal T.

For example, in the case where the adding unit 17 generates the search support output page according to the first aspect, the search support output page as shown in FIG. 6 is displayed on the user terminal T. In this search support output page, the model number "ABC100", which is the product specifying information, is entered as a search default value in the search input field of the product page of the shop A. If the user clicks on "Site Search", keeping the search default value, it is possible to search for the same product as the product on sale on the visited page among a plurality of shops in the virtual shopping mall. In this manner, according to the product search support server 10, because the product specifying information that uniquely specifies a product is entered as a search default value, a user can easily search for a product on sale in other shops without considering a search word that uniquely specifies a product such as a model number and entering the search word.

Figure 11:
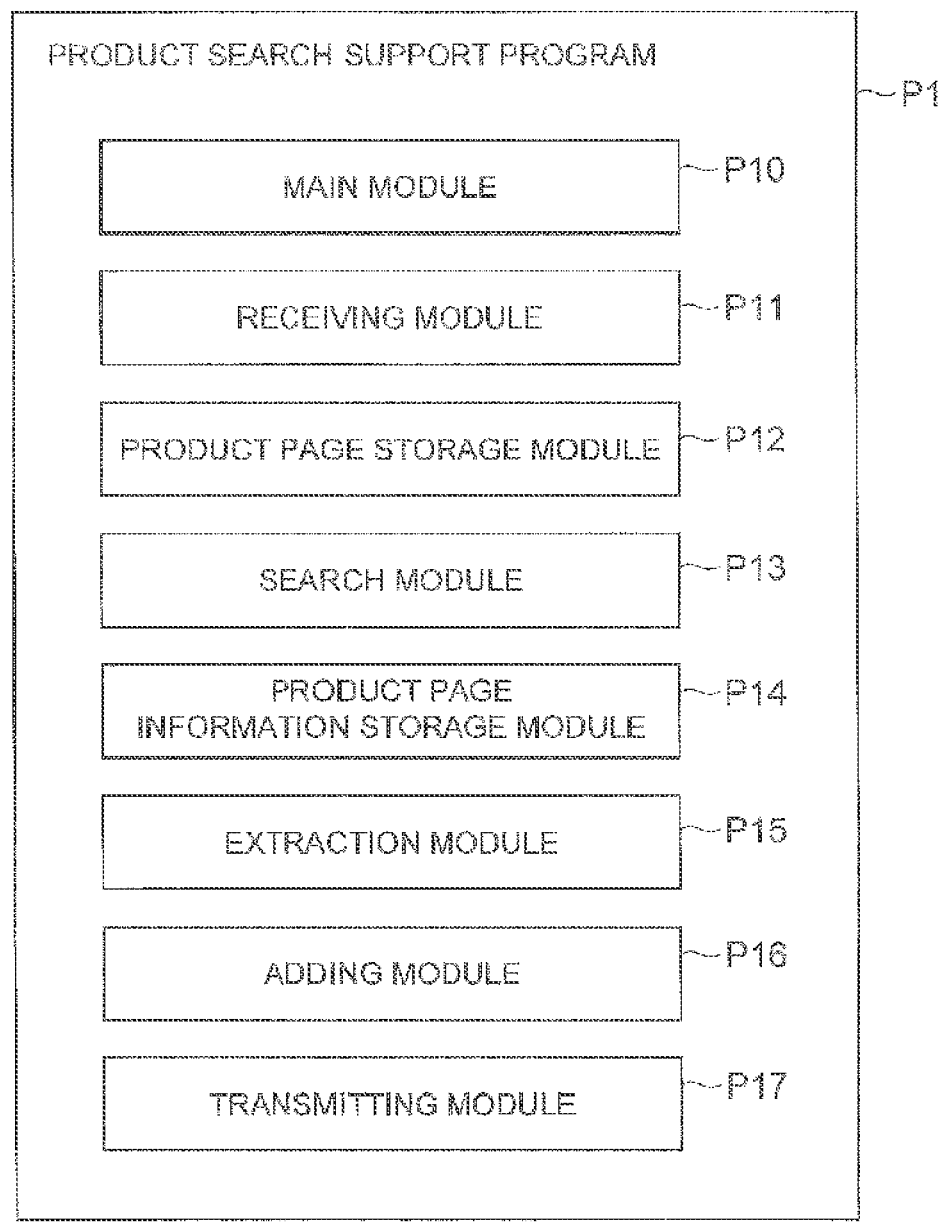
FIG. 11 is a diagram showing a configuration of a product search support program according to the first embodiment.

A product search support program that causes a computer to function as the product search support server 10 is described hereinafter with reference to FIG. 11.

The product search support program P1 includes a main module P10, a receiving module (receiving function) P11, a product page storage module P12, a search module P13, a product page information storage module P14, an extraction module (extraction function) P15, an adding module P16, and a transmitting module (transmitting function) P17.

The main module P10 is a part that exercises control over the product search support function. The functions implemented by executing the main module P10, the receiving module P11, the product page storage module P12, the search module P13, the product page information storage module P14, the extraction module P15, the adding module P16, and the transmitting module P17 are respectively the same as the functions of the receiving unit 11, the product page storage unit 12, the search unit 13, the product page information storage unit 15, the extraction unit 16, the adding unit 17, and the transmitting unit 19 described above.

The product search support program P1 is provided in the form of being recorded on a recording medium such as CD-ROM or DVD-ROM or semiconductor memory, for example. Further, the product search support program P1 may be provided as a computer data signal superimposed onto a carrier wave over a communication network.

As described above, according to this embodiment, product specifying information that can uniquely specify a product on sale on a visited page is extracted, and information based on the product specifying information and a product page of one shop are transmitted to a user. Because the product specifying information can uniquely specify a product, a user can obtain information about a product on sale among a plurality of shops using the information based on the product specifying information. It is thereby possible to facilitate search for a product on sale in another shop.

The adding unit 17 adds a search default value or additional information according to any one of the first to third aspects. In the first aspect, a product page where the product specifying information is entered as a search default value in the search input field 20 of a product page of one shop is transmitted to a terminal of a user, and therefore the user can search for the same product as the product related to a display request from product pages of a plurality of shops simply by making a search with the search default value without need to enter a search word related to the product on sale.

In the second aspect, a product page of one shop to which additional information is added is transmitted to a terminal. The additional information is information about a product page related to the product specifying information. Therefore, a user can obtain information about a product related to the product on sale by referring to the additional information. It is thereby possible to facilitate search for a product on sale in another shop in this embodiment.

In the third aspect, when a transition request from a product page of one shop to a search page is detected, the product specifying information is entered as a search default value in the search input field on the top page of the virtual shopping mall, and therefore the user can search for a desired product from a plurality of shops simply by making a search with the search default value without need to enter a search word related to the product on sale.

Further, according to this embodiment, because the product specifying information is the model number or the unique code of a product, it is possible to uniquely specify a product without fail.

Second Embodiment

A product search support server 10A according to a second embodiment is described hereinafter. The product search support server 10A is different from the product search support server 10 according to the first embodiment in that a reward is paid to one shop that sells a product when a user purchases the same product in another shop through a product page of the one shop. Hereinafter, the same or equal matters as in the first embodiment are not redundantly described.

As shown in FIG. 12, the product search support server 10A further includes a reward information storage unit 22 and a reward granting unit 24. In this embodiment, the receiving unit 11 receives a product purchase request in addition to a display request of a product page of one shop from the user terminal T. The product purchase request is issued when a user performs a procedure to purchase a product through a product page using the user terminal T. The product purchase request contains information indicating a shop where the product is purchased and information indicating the purchased product. The information indicating a shop where the product is purchased is a shop ID, which is an identifier specifying a shop, or a shop name, for example. The information indicating the purchased product is a product ID, which is an identifier specifying a product, or the model number of the product. The receiving unit 11 outputs the product purchase request to the reward granting unit 24.

Further, when the search unit 13 receives a search query from the user terminal T, it outputs the search query to the reward granting unit 24. The transmitting unit 19 outputs the product specifying information to the reward granting unit.

In the case where a user purchases the same product in another shop (which is referred to hereinafter as a "purchase shop") through the product page of the product on sale in one shop (which is referred to hereinafter as a "visited shop"), the visited shop contributes to the sales of the purchase shop. Thus, in this case, a reward is paid to the visited shop.

The reward information storage unit 22 stores reward data indicating the amount of reward to each shop belonging to the virtual shopping mall. The reward data may have different structures according to the way of determining the amount of reward. For example, in the case where part of the sales in another shop is paid as a reward to one shop when the same product is purchased in the purchase shop through the visited shop, the amount of reward is stored in association with a combination of the visited shop and the purchase shop.

The reward granting unit 24 is a means of granting a reward to a visited shop after a product is searched by the product specifying information extracted in the visited shop and the same product is purchased in a purchase shop through the search result. The reward granting unit 24 receives a search request from the search unit 13 and, when the terminal to which the search support output page is transmitted by the transmitting unit 19 and the terminal from which the search request is transmitted are the same user terminal T and a search word contained in the search request and the product specifying information are the same, for example, it determines that the user has gone through a search result by the product specifying information extracted in the visited shop. Then, when the product related to the product specifying information and the product related to the product purchase request are the same, the reward granting unit 24 updates the reward data in the reward information storage unit 22 so that a reward is paid from the purchase shop to the visited shop. Note that, even when a user has not directly gone through a search result by the product specifying information, the reward granting unit 24 may update the reward data in the reward information storage unit 22 so that a reward is paid to the visited shop. For example, even when the user terminal T accesses the product page of the purchase shop from a search result by the product specifying information and adds the product page to the bookmark and, in a later day, opens the bookmark and purchases the product on the product page of the purchase shop, a reward may be paid to the visited shop. Further, the timing when the reward granting unit 24 updates the reward data in the reward information storage unit 22 is arbitrary, and the reward data may be updated at the timing when a product is purchased in the purchase shop or may be updated at the batch processing performed on a regular basis.

The product search support server 10A according to this embodiment has the same advantageous effects as the product search support server 10 according to the first embodiment. Further, because a reward is paid to one shop that contributes to sales of another shop, the sense of unfairness between a plurality of shops can be reduced in this embodiment.

Hereinbefore, the present invention has been described in detail with respect to the embodiments thereof. However, the present invention is not limited to the above-described embodiments. Various changes and modifications may be made therein without departing from the scope of the invention.

Although the product search support server 10, 10A includes a plurality of storage units in the above-described embodiments, those storage units may be placed in a server different from the product search support server 10, 10A. Further, a plurality of storage units may be integrated together, or one storage unit may be stored in a distributed manner as a plurality of storage units.

REFERENCE SIGNS LIST

10,10A . . . product search support server, 11 . . . receiving unit, 12 . . . product page storage unit, 13 . . . search unit, 15 . . . product page information storage unit, 16 . . . extraction unit, 17 . . . adding unit, 19 . . . transmitting unit, 20,21 . . . search input field, 22 . . . reward information storage unit, 24 . . . reward granting unit, P1 . . . product search support program, P10 . . . main module, P11 . . . receiving module, P12 . . . product page storage module, P13 . . . search module, P14 . . . product page information storage module, P15 . . . extraction module, P16 . . . adding module, P17 . . . transmitting module

The invention claimed is:

1. A content search support server configured to communicate with a terminal of a user over a network, the content search support server comprising:
    at least one memory configured to store computer program code; and
    at least one processor configured to access said at least one memory, read said computer program code, and operate as instructed by said computer program code, said computer program code comprising:
        register code configured to cause at least one of said at least one processor to register a plurality of content providers to provide a plurality of contents on a web site;
        storing code configured to cause at least one of said at least one processor to store, in a content information storage, page identifications (IDs) of a plurality of webpages of the registered plurality of content providers of the website, in association with preset content specifying information that is a character string for uniquely specifying a content on each webpage;
        receiving code configured to cause at least one of said at least one processor to receive a display request of a first webpage among the plurality of webpages of the website from the terminal, the display request comprising a page identification (ID) uniquely identifying the first webpage among the plurality of webpages;
        extraction code configured to cause at least one of said at least one processor to extract first content specifying information associated with the first webpage corresponding to the display request from the content information storage;
        transmitting code configured to cause at least one of said at least one processor to transmit, to the terminal, the first webpage where a default value is not entered in a search input field;
        adding code configured to cause at least one of said at least one processor to, in response to detecting a user operation for transitioning from the first webpage to a second webpage, transmit the second webpage where a second search input field for entering a search keyword is included and the first content specifying information for the first webpage is entered, as a default value, in the second search input field to be selectable by the user, the second webpage being different from the first webpage among the plurality of webpages in the website and not a search result page; and
        search code configured to cause at least one of said at least one processor to, in response to a user's selection of the default value in a state where the first content specifying information is entered as the default value in the search input field in the second webpage, receive the first content specifying information as the search keyword, search within the website to extract webpages, among the plurality of webpages of the registered plurality of content providers, that are associated with the first content specifying information in the content information storage, and output a list of the extracted webpages to the terminal.

2. The content search support server according to claim wherein the computer program code further comprises:
behavior history acquisition code configured to cause at least one of said at least one processor to acquire a behavior history of the user from a behavior history storage that stores the behavior history of the user; and
determination code configured to cause at least one of said at least one processor to determine based on the acquired behavior history of the user, whether the user is likely to search within the website based on the first content specifying information for the first webpage, as the search keyword, and
wherein the adding code is further configured to, in response to detecting the user operation for transitioning from the first webpage to the second webpage:
transmit the second webpage where the first content specifying information for the first webpage is entered, as the default value, in the second search input field based on a determination that the user is likely to search within the website based on the first content specifying information in the second search input field of the second webpage, and
transmit the second webpage without entering the first content specifying information for the first webpage, as the default value, in the second search input field based on a determination that the user is not likely to search within the website based on the first content specifying information in the second search input field of the second webpage.

3. The content search support server according to claim 1, wherein the computer program code further comprises:
reward granting code configured to cause at least one of said at least one processor to, based on detecting user purchase of one of contents of the extracted webpages and a content provider providing the user purchased content being different from a content provider corresponding to the first webpage, grant a reward to the content provider corresponding to the first webpage.

4. A content search support method executed by a content search support server configured to communicate with a terminal of a user, the content search support method comprising:
registering a plurality of content providers to provide a plurality of contents on a website;
storing, in a content information storage, page identifications (IDs) of a plurality of webpages of the registered plurality of content providers of the website, in association with preset content specifying information that is a character string for uniquely specifying a content on each webpage;
receiving a display request of a first webpage among the plurality of webpages of the website from the terminal, the display request comprising a page identification (ID) uniquely identifying the first webpage among the plurality of webpages;
extracting first content specifying information associated with the first webpage corresponding to the display request from the content information storage;
transmitting, to the terminal, the first webpage where a default value is not entered in a search input field;
in response to detecting a user operation for transitioning from the first webpage to a second webpage, transmitting the second webpage where a second search input field for entering a search keyword is included and the first content specifying information for the first webpage is entered, as a default value, in the second search input field to be selectable by the user, the second webpage being different from the first webpage among the plurality of webpages in the website and not a search result page; and
in response to a user's selection of the default value in a state where the first content specifying information is entered as the default value in the search input field in the second webpage, receiving the first content specifying information as the search keyword, searching within the website to extract webpages, among the plurality of webpages of the registered plurality of content providers, that are associated with the first content specifying information in the content information storage, and outputting a list of the extracted webpages to the terminal.

5. The content search support server according to claim 1, wherein
the computer program code further comprises: reward granting code configured to cause at least one of said at least one processor to, based on detecting the user purchase of one of contents of the extracted webpages and a content provider providing the user purchased content being different from a content provider corresponding to the first webpage, grant a reward to the content provider corresponding to the first webpage.

6. The content search support server according to claim 3, wherein
the plurality of contents are a plurality of products, and the plurality of webpages are corresponding plurality of product pages of the plurality of products,
the registered plurality of content providers are a registered plurality of shops selling the plurality of products,
the search code is further configured to cause at least one of said at least one processor to, in response to the user's selection of the default value in the state where the first content specifying information is entered as the default value in the search input field, search within the website to extract product pages, among the plurality of product pages of the registered plurality of shops, that are associated with the first content specifying information in the content information storage, and output a list of the extracted product pages to the terminal, and
the reward granting code is further configured to cause at least one of said at least one processor to, in response to detecting the user purchase of one of the plurality of products of the extracted product pages and a shop from which the user purchase is made being different from a shop corresponding to the first webpage, grant the reward to the shop corresponding to the first webpage.

7. A content search support server comprising:
at least one memory configured to store computer program code; and
at least one processor configured to access said at least one memory, read said computer program code, and operate as instructed by said computer program code, said computer program code including:
register code configured to cause at least one of said at least one processor to register a plurality of content providers to provide a plurality of contents on a website;
storing code configured to cause at least one of said at least one processor to store, in a content information storage, page identifications (IDs) of a plurality of webpages of the registered plurality of content providers of the website, in association with preset content specifying information that is a character string for uniquely specifying a content on each webpage;

receiving code configured to cause at least one of said at least one processor to receive a display request of a first webpage among the plurality of webpages of the website from a terminal of a user, the display request comprising a page identification (ID) uniquely identifying the first webpage among the plurality of webpages;

extraction code configured to cause at least one of said at least one processor to extract first content specifying information associated with the first webpage corresponding to the display request from the content information storage;

transmitting code configured to cause at least one of said at least one processor to transmit, to the terminal, the first webpage where a default value is not entered in a search input field;

adding code configured to cause at least one of said at least one processor to, in response to detecting a user operation for transitioning from the first webpage to a second webpage, transmit the second webpage where a second search input field for entering a search keyword is included and the first content specifying information for the first webpage is entered, as a default value, in the second search input field to be selectable by the user, the second webpage being different from the first webpage among the plurality of webpages in the website and not a search result page;

search code configured to cause at least one of said at least one processor to, in response to a user's selection of the default value in a state where the first content specifying information is entered as the default value in the search input field in the second webpage, receive the first content specifying information as the search keyword, search within the website to extract webpages, among the plurality of webpages of the registered plurality of content providers, that are associated with the first content specifying information in the content information storage, and output a list of the extracted webpages to the terminal; and determination code configured to cause at least one of said at least one processor to determine, based on a behavior history of the user, whether the user is likely to search the website based on the first content specifying information as the search keyword, wherein the adding code configured to cause at least one of said at least one processor to transmit the second webpage where the second search input field for entering the search keyword is included and the first content specifying information for the first webpage is entered, as the default value, in the second search input field based on a determination that the user is likely to search the website based on the first content specifying information as the search keyword, and the adding code configured to cause at least one of said at least one processor to transmit the second webpage without entering the first content specifying information for the first webpage, as the default value, in the second search input field based on a determination that the user is not likely to search the website based on the first content specifying information as the search keyword.

8. A content search support method executed by a content search support server comprising:

registering a plurality of content providers to provide a plurality of contents on a website;

storing, in a content information storage, page identifications (IDs) of a plurality of webpages of the registered plurality of content providers of the website, in association with preset content specifying information that is a character string for uniquely specifying a content on each webpage;

receiving a display request of a first webpage among the plurality of webpages of the website from a terminal of a user, the display request comprising a page identification (ID) uniquely identifying the first webpage among the plurality of webpages;

extracting first content specifying information associated with the first webpage corresponding to the display request from the content information storage;

transmitting, to the terminal, the first webpage where a default value is not entered in a search input field;

in response to detecting a user operation for transitioning from the first webpage to a second webpage, transmitting the second webpage where a second search input field for entering a search keyword is included and the first content specifying information for the first webpage is entered, as a default value, in the second search input field to be selectable by the user, the second webpage being different from the first webpage among the plurality of webpages in the website and not a search result page;

in response to a user's selection of the default value in a state where the first content specifying information is entered as the default value in the search input field in the second webpage, receiving the first content specifying information as the search keyword, search within the website to extract webpages, among the plurality of webpages of the registered plurality of content providers, that are associated with the first content specifying information in the content information storage, and output a list of the extracted webpages to the terminal; and determining, based on a behavior history of the user, whether the user is likely to search the website based on the first content specifying information as the search keyword, wherein the transmitting the second webpage comprises:

transmitting the second webpage where the second search input field for entering the search keyword is included and the first content specifying information for the first webpage is entered, as the default value, in the second search input field based on a determination that the user is likely to search the website based on the first content specifying information as the search keyword, and transmitting the second webpage without entering the first content specifying information for the first webpage, as the default value, in the second search input field based on a determination that the user is not likely to search the website based on the first content specifying information as the search keyword.

9. The content search support server of claim 1, wherein the plurality of contents are a plurality of products, and the plurality of content providers are a plurality of shops selling the plurality of products.

* * * * *